United States Patent
Sanchez et al.

(10) Patent No.: US 7,156,197 B2
(45) Date of Patent: Jan. 2, 2007

(54) REVERSING MECHANISM FOR MOTORCYCLES

(76) Inventors: Jesse Sanchez, 4839 W. Muirkirk Rd., West Jordan, UT (US) 84088; Richard Abeyta, 760 Cheyenne St., Salt Lake City, UT (US) 84104

( * ) Notice: Subject to any disclaimer, the term of this patent is extended or adjusted under 35 U.S.C. 154(b) by 170 days.

(21) Appl. No.: 10/915,130

(22) Filed: Aug. 10, 2004

(65) Prior Publication Data

US 2006/0032688 A1    Feb. 16, 2006

(51) Int. Cl.
    *B62M 7/00*    (2006.01)
(52) U.S. Cl. ..................................... 180/219
(58) Field of Classification Search ............... 180/219, 180/220, 221, 65.2, 69.6
    See application file for complete search history.

(56) References Cited

U.S. PATENT DOCUMENTS

| | | |
|---|---|---|
| 4,523,491 A | 6/1985 | Dittman, Jr. |
| 4,583,613 A | 4/1986 | Nakayama |
| 4,763,538 A | 8/1988 | Fujita et al. |
| 4,869,332 A | 9/1989 | Fujita et al. |
| 4,923,028 A * | 5/1990 | Yamashita et al. .......... 180/219 |
| 4,974,695 A | 12/1990 | Politte |
| 5,069,304 A | 12/1991 | Mann |
| 5,469,930 A | 11/1995 | Wiers |
| 5,542,309 A | 8/1996 | Wenger et al. |
| 6,076,416 A | 6/2000 | Sputhe |
| 6,267,192 B1 | 7/2001 | Maier et al. |
| 6,708,579 B1 * | 3/2004 | Punko ........................ 74/425 |
| 2002/0043416 A1 | 4/2002 | Hoechst et al. |
| 2003/0038437 A1 | 2/2003 | Ungvari |

* cited by examiner

*Primary Examiner*—Tony Winner
(74) *Attorney, Agent, or Firm*—Morriss O'Bryant Compagni

(57) ABSTRACT

A reversing mechanism is disclosed for use with motorcycles and other lightweight wheeled recreational vehicles. The reversing mechanism comprises a motorized drive gear that is configured to engage a wheel sprocket attached to the axle of a wheel, such as the drive sprocket that is part of the chain or drive belt assembly of the motorcycle.

20 Claims, 5 Drawing Sheets

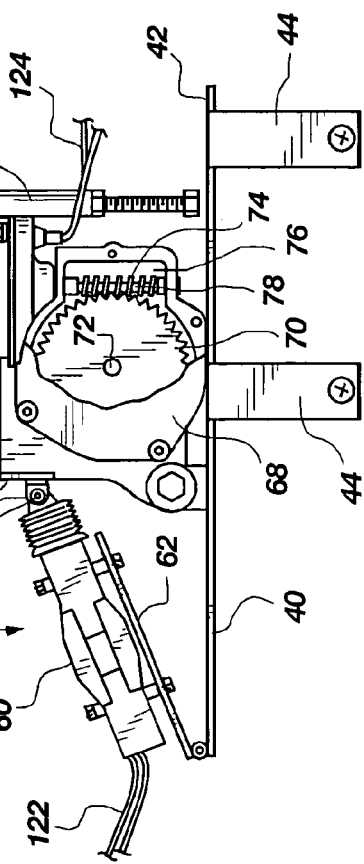
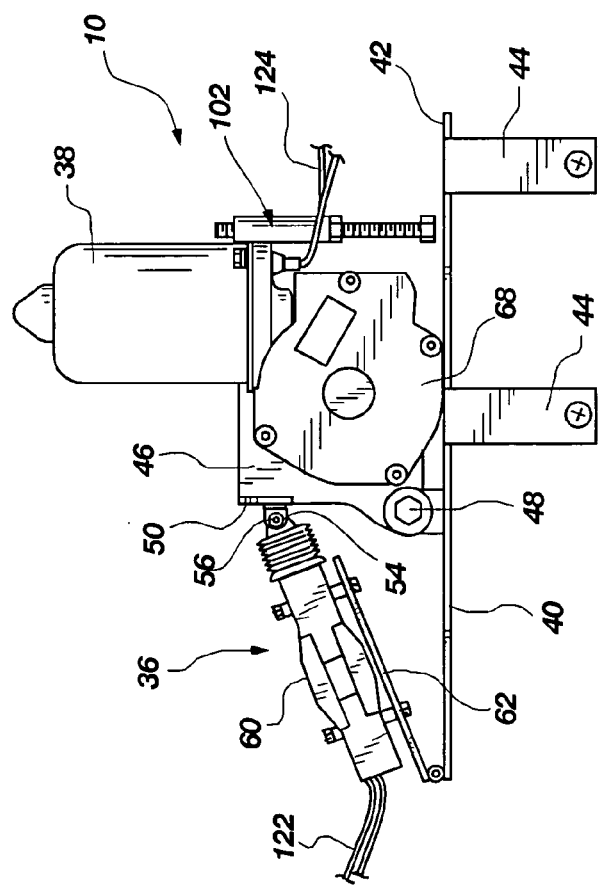
FIG. 4
FIG. 5

REVERSING MECHANISM FOR MOTORCYCLES

BACKGROUND OF THE INVENTION

1. Field of the Invention

This invention relates to motorcycles and similar wheeled recreational vehicles, and specifically relates to a gearing device for facilitating the reversing movement of such vehicles.

2. Description of Related Art

Motorcycles have been in existence for many years, but have become increasingly popular in the last few decades as a more conventional means for transportation and recreation. While the design and structure of motorcycles varies widely between manufacturers, they are all generally comprised of two or three wheels and a drive means that typically operates to drive or rotate the rear wheel or rear wheel axle. Most motorcycles have a gas engine and a transmission, and many have a rear wheel assembly driven by the transmission that includes a chain drive or drive belt.

The drive means and transmissions of motorcycles provide forward movement of the cycle, but few transmissions are manufactured with reversing mechanisms for moving the motorcycle backwards. Consequently, in order to move the motorcycle backwards or in a reverse mode, the rider must physically push the motorcycle backwards, either while being seated on the cycle or while dismounted from the cycle. Manually walking a motorcycle backwards to, for example, back out of a parking space, is not particularly problematic with smaller sized motorcycles or where the rider is a taller, stronger adult.

However, in the past two decades motorcycles have been manufactured in increasingly larger sizes due to public demand, and frequent riders of motorcycles now include women, older children, elderly people and those who are physically challenged, yet still able to enjoy riding motorcycles. Additionally, with the increase in size of motorcycles has come the ability to tow small trailers behind motorcycles. These factors have, therefore, given rise to a need for providing means for reversing motorcycles by other than manual means (i.e., walking the bike backwards) in instances where the cycle is large, riders are of smaller stature or lesser strength capabilities and/or where the motorcycle is used to tow small trailers or other devices.

The need for a reversing mechanism in motorcycles for the reasons stated previously has been recognized for several years, and various solutions have been devised for solving the problem. For example, means for providing a reversing gear in a transmission for a motorcycle are disclosed in U.S. Pat. No. 4,523,491 and in U.S. Pat. No. 6,076,416. However, a reversing gear in the transmission has proven to be unsafe in many instances because the engine, operating at a sufficiently high speed as the clutch is engaged, can cause the motorcycle to reverse too abruptly making the motorcycle and rider unstable. Other reversing devices have been proposed which use a starter motor rather than the combustion engine or transmission as a means for driving the rear wheel in a reverse direction, such as are disclosed in U.S. Pat. No. 4,763,538 and U.S. Pat. No. 4,869,332.

It has also been recognized that although reversing mechanisms can be manufactured into the transmission, such arrangements are costly and do not address the need for providing reversing mechanisms in pre-existing motorcycles. Therefore, other reversing mechanisms have been disclosed which are not associated with the transmission and may be retrofitted to the motorcycle. Examples of such devices are disclosed in U.S. Pat. No. 4,974,695 and U.S. Pat. No. 5,069,304, both of which describe a reversing mechanism that includes a friction wheel that engages the tread of the rear tire to cause rotation of the rear tire in a reverse direction. Such devices frequently prove to be insufficient for effecting rotation of the tire, especially in larger sized motorcycles.

An even simpler solution to the reversing problem is proposed in U.S. Published application US 2003/0038437, published Feb. 27, 2003, which discloses a portable reverse drive comprised of a frame having rollers and wheels that rotate in a direction opposite the forward rotation of the motorcycle wheel when the wheel is positioned in the frame. The portable reverse drive, while seemingly effective, appears to be cumbersome to use since the rider must position the device on the tire, back the cycle up, then get off the cycle again to retrieve and store the device in a saddlebag or elsewhere prior to riding off.

The reversing devices heretofore described each have limitations to cost-effective and/or mechanical operation, as described. Therefore, it would be advantageous in the art to provide a reversing mechanism that is inexpensively manufactured, easily attached to any motorcycle or multiple-wheeled, lightweight recreational vehicle, and which is simple to use and effective in providing reversing capabilities for the vehicle.

BRIEF SUMMARY OF THE INVENTION

In accordance with the present invention, a motorized reversing mechanism is provided for a motorcycle or other lightweight wheeled recreational vehicle which is structured to engage a wheel sprocket secured to a wheel axle of the vehicle to effect reverse rotation of the wheel. The invention is described herein with respect to installation on a two-wheeled motorcycle by way of example, but the invention may be installed or adapted for use on any lightweight, multiple-wheeled recreational vehicle, such as three-wheeled motorcycles, motorcross bikes, all-terrain vehicles, and the like, which may not typically be manufactured with reversing gears or mechanisms.

The reversing mechanism of the present invention generally comprises a drive gear that is configured to engage a wheel sprocket that is attached to a wheel axle of the motorcycle. A motor is provided for rotating the drive gear when engaged with the wheel sprocket to effect reverse movement of the motorcycle wheel. The invention further includes an engagement device for selectively moving the drive gear into and out of engagement with the wheel sprocket. Actuation apparatus is also provided for enabling the engagement device and enabling the operation of the motor to effect reverse movement of the motorcycle wheel.

The drive gear of the invention may be of any suitable configuration or design which provides engagement of the drive gear with a wheel sprocket attached to a wheel axle of the motorcycle. By way of example only, the drive gear may be configured with cogs or teeth that intermesh with the cogs of a conventional drive sprocket of a motorcycle that is provided to drive the cycle by chain or belt means. Alternatively, the wheel sprocket may be an auxiliary wheel member that is likewise positioned on the wheel axle of the motorcycle, separate from the drive sprocket, but which is capable of providing reverse rotation of the wheel via the present invention. It is most suitable that the wheel sprocket be attached to the rear wheel of the motorcycle, although alternative arrangements might be equally suitable.

The motor of the present invention may be of any suitable size and configuration as long as the drive shaft of the motor is suitably positioned to drive the drive gear. In a particularly suitable embodiment, the motor is a small 12 volt DC motor that is separate from the engine and/or transmission of the motorcycle. A 12 volt DC motor provides sufficient power to the drive gear to enable rotation of the rear wheel of all larger sized motorcycles at a speed which is conducive to safe reversing maneuvers. It may be desirable or necessary to increase or decrease the voltage or size of the motor, however, depending on the size of the motorcycle and other parameters.

An engagement device is provided to move the drive gear into and out of engagement with the wheel sprocket. By way of example only, the engagement device may be a solenoid that is mounted in a suitable fashion to or near the drive gear to selectively move the drive gear into registration with the wheel sprocket. Other engagement devices may be equally suitable for use in the invention.

The actuation apparatus of the invention is electrically connected to the engagement device and motor for effecting registration of the drive gear with the wheel sprocket and causing rotation of the drive gear upon demand when backing the motorcycle is desired. The actuation apparatus may be any suitable device and preferably includes a switch, which is conveniently located for access by the rider. For example, an actuation switch may be provided on the handlebar of the motorcycle for easy access.

In use, the motorcycle ignition is switched to the on position and the transmission is placed in neutral. The actuation apparatus is then enabled which in turn powers the motor and activates the engagement device to move the drive gear into registration with the wheel sprocket. The drive gear rotates via the drive shaft of the motor and, when in engagement with the wheel sprocket, causes the wheel sprocket, and thus the wheel, to rotate in a reversing direction to normal drive. Once the motorcycle has been backed up, the actuation apparatus is disengaged thereby cutting power from the motor and causing the engagement device to move the drive gear out of registration with the wheel sprocket. The motorcycle transmission may then be put in gear for normal forward motion of the cycle.

BRIEF DESCRIPTION OF THE SEVERAL VIEWS OF THE DRAWINGS

In the drawings, which illustrate what is currently considered to be the best mode for carrying out the invention:

FIG. 4 is a view in elevation of the reversing mechanism shown in FIG. 3 rotated 180°;

FIG. 5 is a view in elevation and partial cutaway of the invention showing the internal gear mechanism of the invention;

DETAILED DESCRIPTION OF THE INVENTION

Figure 1:
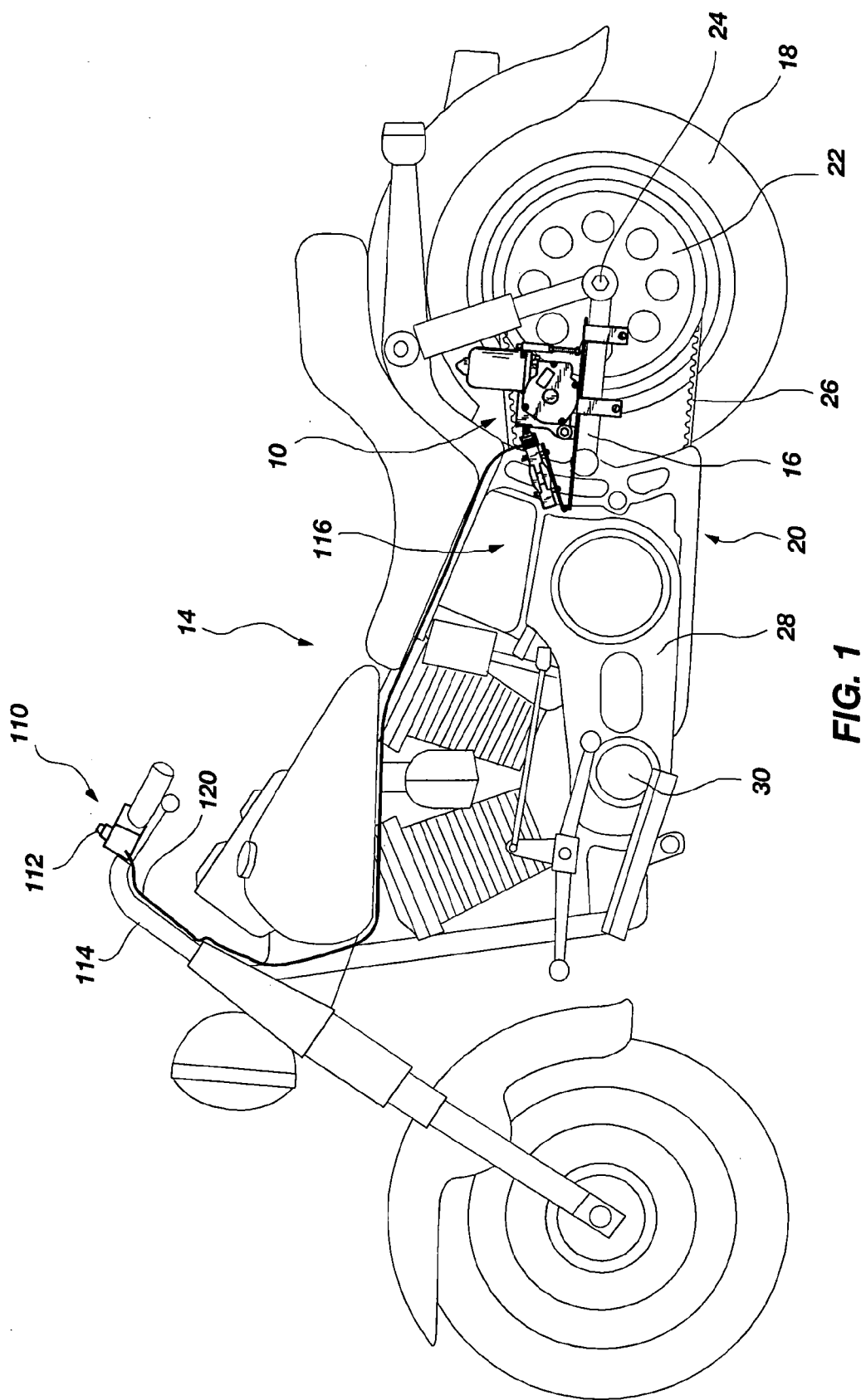
FIG. 1 is a side view in elevation of a motorcycle illustrating the positioning of the reversing mechanism of the present invention attached thereto.

FIG. 1 illustrates a simplified embodiment of the reversing mechanism 10 of the present invention installed on a two wheeled motorcycle 14. While the reversing mechanism 10 is shown installed on a two-wheeled motorcycle, it should be noted that the reversing mechanism 10 can be adapted for use and installation on any two-, three-or four wheeled vehicle of lighter weight and size, such as those typically used for recreational use, and those which may not be manufactured with transmissions having a reversing gear.

The reversing mechanism 10 is attached to the motorcycle 14 by securement to the frame or some other stationary element of the motorcycle 14, and is shown here as being attached to the swing arm 16. The reversing mechanism 10 is positioned in close proximity to the driven wheel of the motorcycle 12, which is typically the rear wheel 18. The present invention is particularly configured for use with motorcycles or other vehicles which have a drive assembly 20 that includes a drive sprocket 22 connected to the axle 24 of the rear wheel 18, a drive chain 26, that may be either a metal chain or, as shown, a drive belt, and a motorized transmission 28 having an output shaft 30 for transmitting power to the drive chain 26. Alternatively, a wheel sprocket separate from the drive sprocket may be provided as described more fully hereinafter.

Figure 3:
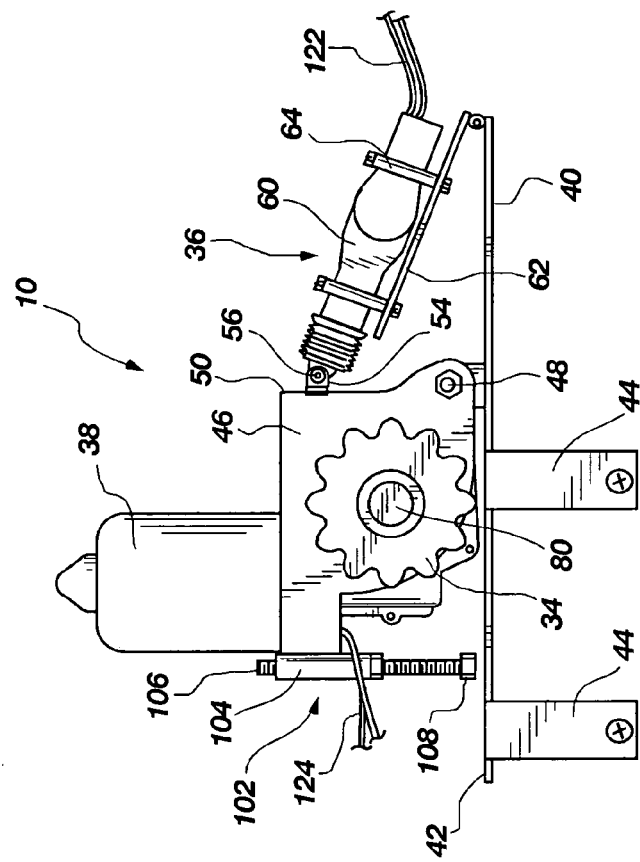
FIG. 3 is a view in elevation of the reversing mechanism of the invention shown in FIG. 2.
Figure 2:
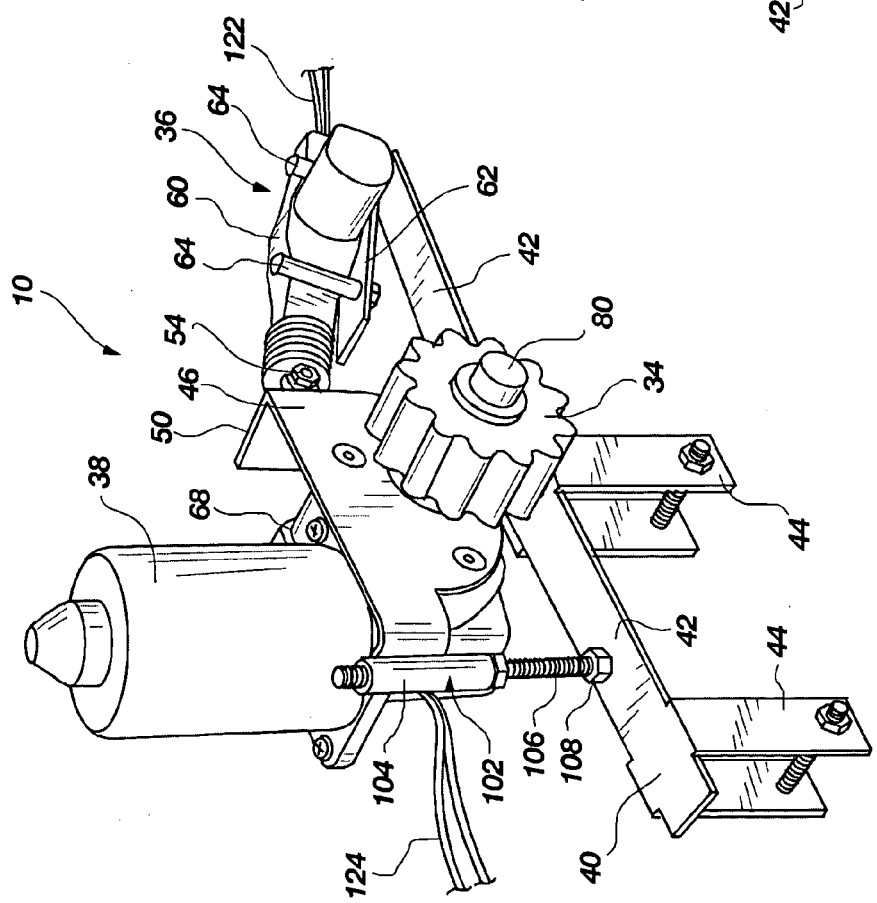
FIG. 2 is a perspective view of the present invention.

FIGS. 2 and 3 illustrate more specifically the reversing mechanism 10, which generally comprises a drive gear 34, an engagement device 36 and a motor 38. Those elements are connected to a support bracket 40 that is configured for attachment of the reversing mechanism 10 to a suitable portion of the motorcycle, as previously described. The support bracket 40 may, by way of example only, comprise a base member 42 and one or more positioning brackets 44 that aid in attaching the reversing mechanism 10 to the motorcycle 10.

The drive gear 34 is secured to the support bracket 40 by attachment to a mounting plate 46 that is connected to the base member 42 by a pivot pin 48 or suitable equivalent. As best seen in FIG. 2, the mounting plate 46 includes an end face 50 which provides an attachment point for the engagement device 36. The engagement device 36 is thus secured to the end face 50 of the mounting plate 46 by means of an attachment member 54 which may, in a preferred embodiment, provide a pivot pin 56 for connection to the engagement device 36.

The engagement device 36 may be any suitable apparatus that is capable of moving the drive gear 34 into and out of engagement with a wheel sprocket, such as the drive sprocket 22 (FIG. 1), attached to the wheel axle 24. By way of example, the engagement device 36 shown in the illustrations is a conventional solenoid 60. The solenoid 60 is secured to an auxiliary arm 62 of the support bracket 40 by attachment means 64. The auxiliary arm 62 is positioned relative to the base member 42 of the support bracket 40 to enable the solenoid 60 to move the mounting plate 46 about pivot pin 48, as will be described further hereinafter.

The mounting plate 46 further serves as a means for attachment of a gear housing 68 as shown in FIG. 1, but as best seen in FIGS. 4 and 5. The gear housing 68 encloses a rachet gear 70 that rotates about a central axle 72 journalled within the gear housing 68, as shown in FIG. 5. The gear housing 68 also supports the motor 38 and provides for attachment of the motor 38 to the gear housing 68. As seen in FIG. 5, the motor 38 is positioned so that the drive shaft 74 of the motor 38 extends through the gear housing 68 to the interior 76 of the gear housing 68. The drive shaft 74 is fitted on its exterior with a worm gear 78 that is positioned and configured to intermesh with the ratchet gear 70, also housed within the gear housing 68.

Referring again to FIGS. 2 and 3, it can be seen that the drive gear 34 is positioned on a central shaft 80 that extends to and/or through the mounting plate 46 and attaches to the central axle 72 of the ratchet gear 70. Consequently, as the ratchet gear 70 is rotated by the worm gear 78 driven by the drive shaft 74 of the motor 38, the rotation of the ratchet gear 70 causes rotation of the drive gear 34.

Figure 7:
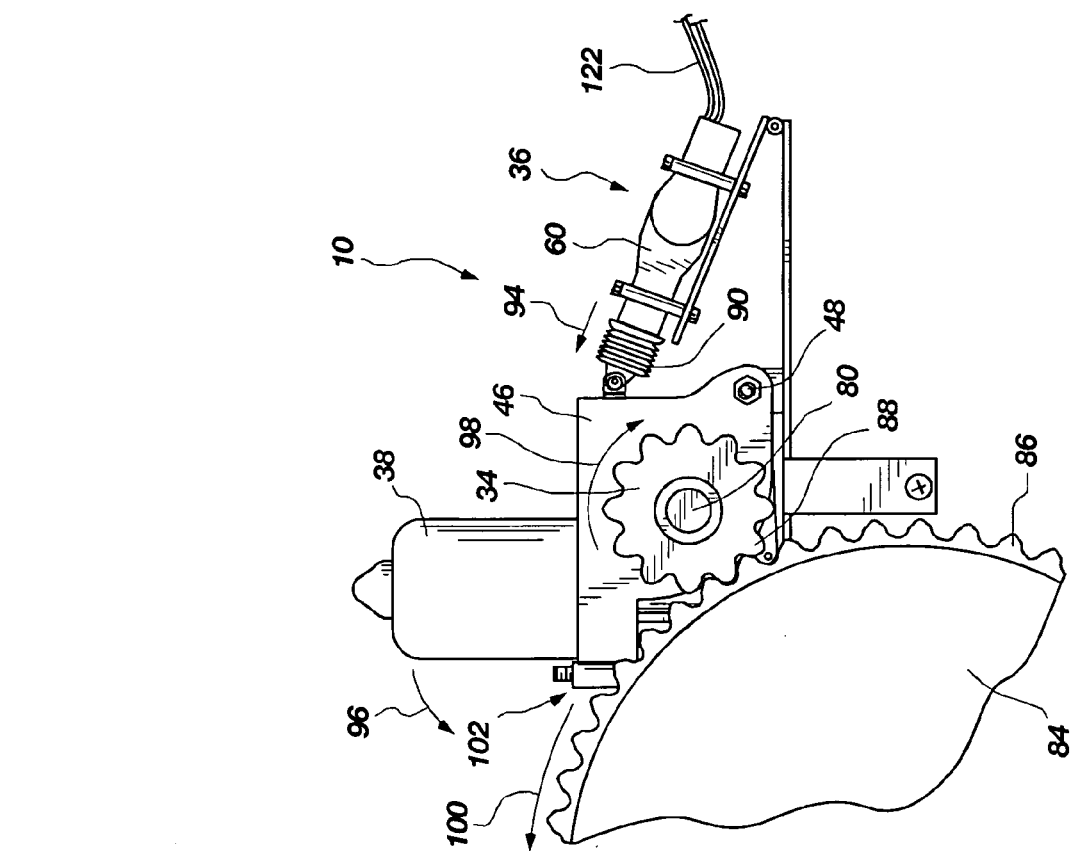
FIG. 7 is a view in elevation of the reversing mechanism positioned in engagement with the wheel sprocket of a motorcycle.
Figure 6:
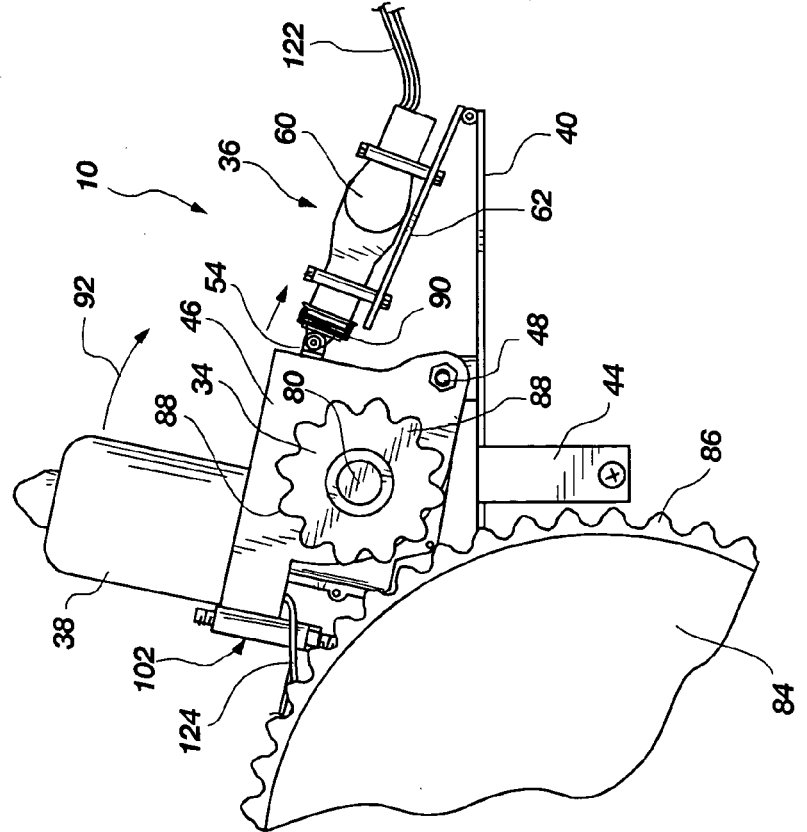
FIG. 6 is a view in elevation of the reversing mechanism positioned relative to the wheel sprocket of a motorcycle and being in a state of disengagement therefrom.

FIGS. 6 and 7 illustrate the operation of the reversing mechanism 10. FIG. 6 illustrates a first position of the reversing mechanism 10 in a state of disengagement from a wheel sprocket 84 attached to the wheel axle 24 of a motorcycle. As illustrated in FIG. 1, the wheel sprocket 84 may be the drive sprocket 22 to which the drive chain 26 is attached to effect rotation of the rear wheel 18. However, the wheel sprocket 84 may be a member other than the drive sprocket 22 and is attached to the wheel axle 24 adjacent to the drive sprocket 22. In either case, the wheel sprocket 84 is structured in a suitable manner with a plurality of cogs 86 or teeth that are sized and dimensioned to intermesh with the drive gear 34, which has suitable cog elements 88 for intermeshing with the wheel sprocket 84.

Again, FIG. 6 illustrates the drive gear 34 being disengaged from the wheel sprocket 84. This position may be considered the typical or neutral position of the drive gear 34 and reversing mechanism 10 when not in use. The drive gear 34 is held in a position away from the wheel sprocket 84 by movement of the solenoid plunger 90, shown here surrounded by a bellows sleeve, which causes the mounting plate 46 to rotate about pivot pin 48 in the direction of arrow 92. The drive gear 34 remains stationary (i.e., non-rotational) when the mounting plate 46 is pivoted away from the wheel sprocket 84 as shown in FIG. 6.

FIG. 7 illustrates a second position of the reversing mechanism 10 corresponding to an engaged condition of the drive gear 34 to the wheel sprocket 84. When actuated, the plunger 90 of the solenoid moves in the direction of arrow 94 causing the mounting plate 46 to rotate about pivot pin 48 in the direction of arrow 96. Concurrent or subsequent activation of the motor 38 causes the drive gear 34 to begin rotating in the direction of arrow 98. Rotation of the drive gear 34 in the direction of arrow 98 consequently causes the wheel sprocket 84 to begin to rotate in the direction of arrow 100, thereby causing the wheel to which the wheel sprocket 84 is connected to rotate in a reverse direction.

The appropriate meshing of the drive gear 34 to the wheel sprocket 84 may be selectively determined by an adjustment member 102, as best seen in FIGS. 2–5. In a very simplified embodiment of the adjustment member 102 shown best in FIG. 2, a threaded sleeve 104 is attached to the mounting plate 46 and receives a threaded bolt 106 therethrough that is of sufficient length such that the head 108 of the bolt 106 is capable of making contact with the base member 42 of the support bracket 40. Contact between the head 108 of the bolt 106 and the support bracket 40 serves as a limitation to the rotation of the mounting plate 46 around the pivot pin 48. Therefore, if, for example, the wheel sprocket 84 (e.g., drive sprocket 22) is of a large diameter such as may be found on a very large motorcycle, the mounting plate 46 will not need to rotate appreciably in the direction of arrow 96 (FIG. 7) to engage the drive gear 34 to the wheel sprocket 84, and in that case, the bolt 106 would be adjusted downwardly toward the support bracket 40.

In the case of smaller motorcycles having a smaller drive sprocket 22 or in the case of using a smaller diameter auxiliary wheel sprocket 84, it may be necessary for the mounting plate 46 to rotate farther in the direction of arrow 96 (FIG. 7) to assure engagement of the drive gear 34 with the wheel sprocket 84. Thus, the bolt 106 would need to be rotated farther into the sleeve 104 in a direction away from the support bracket 40, thereby providing a greater arc of rotation of the mounting plate 46 about pivot pin 48. The adjustment member 102, therefore, allows the reversing mechanism 10 to be adapted to any size diameter of wheel sprocket.

Actuation apparatus 110 as suggested in FIG. 1 is further provided to actuate the engagement device 36 and motor 38 to thereby effect reverse rotation of the wheel as previously described. As shown in FIG. 1, the actuation apparatus 110 may comprises a start button 112 that is attached to the handlebar 114 of the motorcycle 14. The actuation apparatus 110 may, however, be positioned at any suitable location on the motorcycle 14 such as, for example, placing the start button 112 near the engine 116 of the motorcycle.

Figure 8:
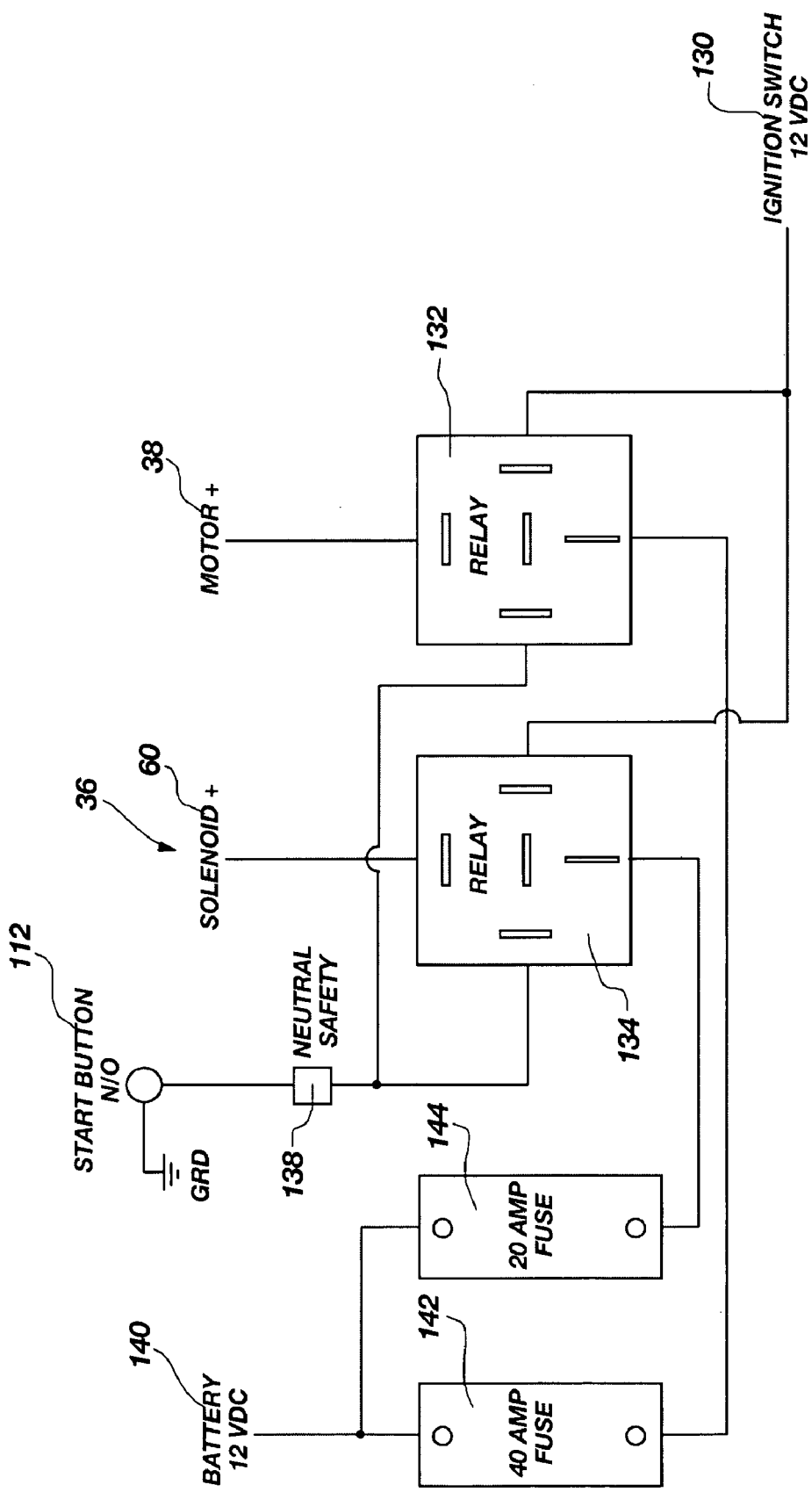
FIG. 8 is a schematic representation of an exemplary wiring for the actuation apparatus of the present invention.

The actuation apparatus 110 further includes appropriate wiring 120 from the start button 112 to the engagement device 36 and motor 38. Thus, as shown in FIGS. 2–7, wiring 122 emanates from the engagement device 36 and wiring 124 emanates from the motor 38 to supply power to those elements. FIG. 8 illustrates one exemplary wiring schematic for the actuation apparatus 110 of the invention described herein and illustrates further the operation of the reversing mechanism.

As shown in FIG. 8, the ignition switch 130 of the motorcycle is wired to a first relay 132 associated with the motor 38 and a second relay 134 associated with the solenoid 60. When the ignition 130 of the motorcycle is turned to the "on" position, a signal is sent to the first relay 132 and second relay 134, and to the start button 112. Consequently, the start button 12 is inoperable unless the ignition switch 130 is in the "on" position. The transmission must be in neutral prior to activation of the motor 38 and engagement device 36. Thus, a neutral safety device 138 is provided to assure that the transmission is in neutral when the start button 112 is pushed to "on." If the transmission is not in neutral, the neutral safety 138 will prevent activation of the engagement device 36 and motor 38.

With ignition switch 130 in the "on" position and the transmission in neutral, the start button 112 is depressed or moved to the "on" position. A signal is sent to the first relay 132 and second relay 134 to initiate power to the motor 38 and solenoid 60 respectively. As shown, the solenoid 60 and motor 38 are wired to the battery 140 of the motorcycle and draw power from the battery 140. Appropriate fuses are illustrated between the motor 38 and the battery 140, here shown as a 40 amp fuse 142, and between the solenoid 60 and the battery 140, here shown as a 20 amp fuse 144.

As previously noted, when power is sent to the engagement device 36, the mounting plate 46 is caused to rotate in a manner to move the drive gear 34 into intermeshing engagement with the wheel sprocket 84, and power sent to the motor 38 causes the drive gear 34 to rotate in a reversing direction. When the motorcycle has been reversed or backed up to the desired position, the start button 112 is depressed again or switched to the "off" position which prevents a signal to the first relay 132 and second relay 134 and the motor 38 and engagement device 36, respectively, cease to operate. Consequently, the drive gear 34 ceases to rotate and the mounting plate 46 is moved by the engagement device 36 so that the drive gear 34 is taken out of engagement with the wheel sprocket 84.

The motor 38 of the present invention may be of any suitable size and power output. In a preferred embodiment, the motor may be a 12 volt DC motor, which has sufficient power output to provide reverse rotation of the wheel of larger motorcycles. A smaller or larger motor output may be desired, however. It should be noted that the schematic of FIG. 8 is merely by way of example and those of skill in the art will understand that the actuation apparatus 110 of the invention may comprise various elements and be adapted in a number of ways to provide power to the basic elements of the invention for effecting reverse motion in the motorcycle.

The reversing mechanism of the present invention is structured for providing motorized reverse movement of a motorcycle or other lightweight wheeled vehicle, and particularly those that are manufactured without a reversing gear in the transmission. The reversing mechanism of the present invention is adaptable for use in a number of wheeled vehicles and is adaptable for use with varying designs of vehicles, such as different models and sizes of motorcycles. Thus, reference herein to illustrated details of the exemplary embodiment of the invention is by way of mere illustration and not meant to limit the invention to those details shown or described.

What is claimed is:

1. A reversing mechanism for wheeled vehicles, comprising:
    a drive gear configured to intermeshingly engage with and thereby cause rotation of a wheel sprocket attached to the axle of a wheeled vehicle;
    a motor for rotating said drive gear when intermeshingly engaged with a wheel sprocket;
    an engagement device interconnected to said drive gear for selectively engaging said drive gear with a wheel sprocket; and
    actuation apparatus in communication with said motor and said engagement device to actuate engagement of said drive gear with a wheel sprocket and cause rotation of said drive gear.

2. The reversing mechanism of claim 1 wherein said drive gear is positioned to engage the drive sprocket of a motorcycle.

3. The reversing mechanism of claim 1 wherein said drive gear is positioned to engage a wheel sprocket attached to the rear wheel axle of a wheeled vehicle.

4. The reversing mechanism of claim 1 wherein said drive gear is pivotally attached to a support and said engagement device is attached to said drive gear in a manner to pivotally rotate said drive gear into and out of engagement with a wheel sprocket.

5. The reversing mechanism of claim 4 wherein said engagement device is a solenoid attached to said drive gear by a mounting plate pivotally attached to a support.

6. The reversing mechanism of claim 1 further comprising an adjustment member for selectively adjusting the engagement of said drive gear to a wheel sprocket.

7. The reversing mechanism of claim 1 wherein said actuation apparatus includes a switch that is in electrical communication with said engagement device and said motor.

8. The reversing mechanism of claim 1 further comprising a neutral safety device for providing activation of the actuation apparatus only when the transmission of the vehicle is in neutral gear.

9. The reversing mechanism of claim 1 wherein said motor is a 12 volt DC motor.

10. A reversing mechanism for wheeled vehicles, comprising:
    a support bracket for attachment to a motorcycle;
    a mounting plate pivotally connected to said support bracket;
    a drive gear configured to engage and rotate a wheel sprocket attached to the axle of a wheeled vehicle, said drive gear being connected to said mounting plate;
    a motor for driving said drive gear, said motor being attached to said mounting plate;
    an engagement device attached to said support bracket and said mounting plate to pivotally rotate said mounting plate relative to said support bracket; and
    actuation apparatus in communication with said motor and said engagement device to actuate engagement of said drive gear with a wheel sprocket and cause rotation of said drive gear.

11. The reversing mechanism of claim 10 further comprising an adjustment member positioned to selectively limit the rotational movement of said mounting plate relative to said support bracket.

12. The reversing mechanism of claim 10 wherein said engagement device is a solenoid.

13. The reversing mechanism of claim 10 wherein said motor is a 12 volt DC motor.

14. The reversing mechanism of claim 10 wherein said actuation apparatus further comprises a start button in electrical communication with the ignition switch of the vehicle to which the reversing mechanism is attached.

15. The reversing mechanism of claim 14 wherein said actuation apparatus further comprises a neutral safety device associated with said start button which prevents actuation of said motor and engagement device when the transmission of the vehicle is not in neutral gear.

16. The reversing mechanism of claim 10 wherein said drive gear is structured as a cog wheel having cogs that intermesh with complimentary cogs on a wheel sprocket.

17. The reversing mechanism of claim 16 wherein said drive gear is positioned to engage with the drive sprocket attached to the wheel axle of a vehicle.

18. A reversing mechanism for a motorcycle, comprising:
    a motorized drive shaft;
    a drive gear driven by said motorized drive shaft and positioned to selectively intermeshingly with engage a wheel sprocket attached to the axle of a motorcycle; and
    an engagement device positioned to selectively move said drive gear into and out of intermeshingly engagement with the wheel sprocket of the motorcycle.

19. The reversing mechanism of claim 18 wherein said drive gear is positioned and configured to engage the drive sprocket of the motorcycle.

20. The reversing mechanism of claim 18 further comprising actuation apparatus for activating said engagement device and effecting movement of said drive shaft to rotate said drive gear.

* * * * *